United States Patent
Hughes et al.

(10) Patent No.: US 8,683,457 B1
(45) Date of Patent: Mar. 25, 2014

(54) UPDATING FIRMWARE OF AN ELECTRONIC DEVICE BY STORING A VERSION IDENTIFIER IN A SEPARATE HEADER

(75) Inventors: Nathan J. Hughes, Fort Collins, CO (US); Michael S. Allison, Fort Collins, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 298 days.

(21) Appl. No.: 13/163,337

(22) Filed: Jun. 17, 2011

(51) Int. Cl.
*G06F 9/44* (2006.01)
*G06F 9/445* (2006.01)

(52) U.S. Cl.
USPC ............ 717/170; 717/168; 717/169; 717/174

(58) Field of Classification Search
None
See application file for complete search history.

(56) References Cited

U.S. PATENT DOCUMENTS

| | | |
|---|---|---|
| 6,640,334 B1 | 10/2003 | Rasmussen |
| 7,185,191 B2 | 2/2007 | Bosley et al. |
| 7,197,634 B2 | 3/2007 | Kruger et al. |
| 7,299,463 B2 | 11/2007 | Brannock et al. |
| 7,392,518 B1 | 6/2008 | Chhabra et al. |
| 7,421,688 B1 | 9/2008 | Righi et al. |
| 7,426,633 B2 | 9/2008 | Thompson et al. |
| 7,533,290 B2 | 5/2009 | Chen |
| 7,558,915 B2 | 7/2009 | Cherian et al. |
| 7,911,906 B2 | 3/2011 | Weirauch et al. |
| 8,255,896 B2 * | 8/2012 | Wontorcik et al. ............ 717/170 |
| 8,347,282 B2 * | 1/2013 | Yoshimura et al. ............ 717/170 |
| 2005/0108701 A1 * | 5/2005 | Kwon et al. ................... 717/168 |
| 2006/0117314 A1 * | 6/2006 | Sato ............................... 717/174 |
| 2007/0174832 A1 * | 7/2007 | Brehm et al. ................. 717/174 |
| 2007/0288914 A1 * | 12/2007 | Brannock et al. ............. 717/169 |
| 2008/0250403 A1 * | 10/2008 | Moon et al. ................... 717/169 |
| 2008/0256527 A1 * | 10/2008 | Lee et al. ...................... 717/168 |
| 2009/0064124 A1 * | 3/2009 | Chung .......................... 717/168 |
| 2009/0064125 A1 * | 3/2009 | Venkatachalam et al. ..... 717/170 |
| 2009/0125897 A1 * | 5/2009 | Matlin et al. ................... 717/168 |
| 2009/0282399 A1 * | 11/2009 | Kamrowski .................. 717/174 |
| 2010/0169709 A1 * | 7/2010 | Chiu et al. ...................... 714/16 |
| 2011/0138374 A1 * | 6/2011 | Pal ................................ 717/169 |
| 2011/0208975 A1 * | 8/2011 | Sibert ........................... 713/189 |
| 2011/0296399 A1 * | 12/2011 | Tugnawat et al. ............. 717/174 |
| 2012/0124568 A1 * | 5/2012 | Fallon et al. .................. 717/169 |

OTHER PUBLICATIONS

Sparv Systems, Version Control Best Practices for Enterprise Architect, 2010, pp. 4-17.*
LAS 1.2, LAS Specification Version 1.2, 2008, pp. 2-6.*
Jannik Laval, Supporting Simultaneous Versions for Software Evolution Assessment, 2010, pp. 3-8.*
Curits E. Stevens, "Information technology—AT Attachment 8—ATA/ATAPI Command Set (ATA8-ACS)", T13/1699-D, Revision 6, Jun. 25, 2008, http://www.t13.org, pp. 107-109.
Ralph O. Weber, "Information technology—SCSI Primary Commands—4 (SPC-4)", T10/1731-D, Revision 30, Mar. 31, 2011, http://www.t10.org, pp. 397-403.

* cited by examiner

*Primary Examiner* — Thuy Dao
*Assistant Examiner* — Mongbao Nguyen

(57) ABSTRACT

An electronic device is disclosed comprising a non-volatile memory storing a first version of a control program (CP), a first header comprising a first version identifier (VID) identifying the first version of the CP and a first VID check code generated in response to at least the first VID. The non-volatile memory further stores a second version of the CP, and a second header comprising a second VID identifying the second version of the CP and a second VID check code generated in response to at least the second VID. When the first and second VIDs are valid, the electronic device selects between the first version and the second version of the CP in response to the first and second VIDs, and executes the selected version of the CP.

14 Claims, 6 Drawing Sheets

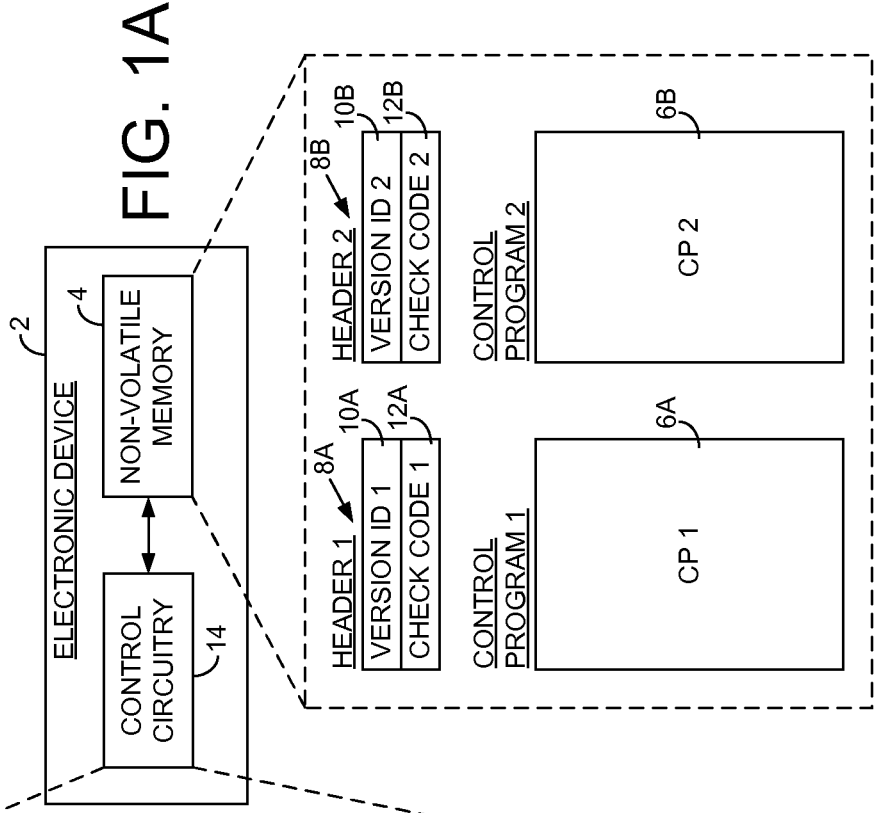
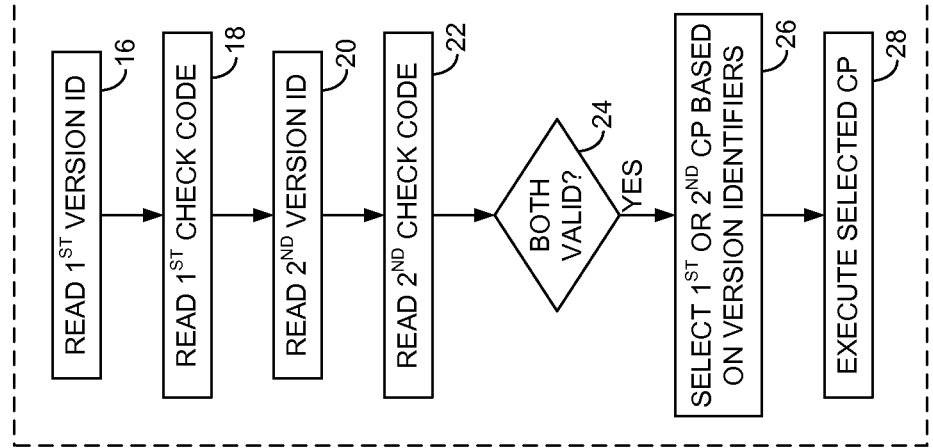

UPDATING FIRMWARE OF AN ELECTRONIC DEVICE BY STORING A VERSION IDENTIFIER IN A SEPARATE HEADER

BACKGROUND

Electronic devices are ubiquitous in society, including business devices such as desktops, laptops, portables, servers, etc., as well as consumer devices such as music players, cell phones, cameras, digital video recorders, televisions, set-top boxes, game players, etc., as well as system components such as disk drives, solid state drives, printers, monitors, etc. An electronic device typically comprises a microprocessor executing code segments of a control program for controlling various operations of the electronic device. The control program is typically stored in a non-volatile memory, such as in a non-volatile semiconductor memory (e.g., a flash memory), or on a non-volatile disk (e.g., an optical or magnetic disk drive).

From time to time it may be desirable to update an electronic device with a new version of the control program. The control program may be updated by downloading a new version from a network (e.g., Internet, cellular network, cable network, etc.), or by the electronic device reading the new version from a removable storage medium (e.g., optical disk, flash card, USB drive, etc.). Typically it is desirable to update the control program in a fail safe manner to avoid rendering the electronic device inoperable if the program update is interrupted (e.g., due to a power failure).

BRIEF DESCRIPTION OF THE DRAWINGS

FIG. 1A shows an electronic device according to an embodiment of the present invention comprising a non-volatile memory storing first and second version identifiers (VIDs) corresponding to first and second versions of a control program (CP).

FIG. 1B is a flow diagram according to an embodiment of the present invention wherein when both VIDs are valid, the electronic device selects between first and second versions of the CP based on the VIDs.

DETAILED DESCRIPTION OF EMBODIMENTS OF THE INVENTION

Figure 2:
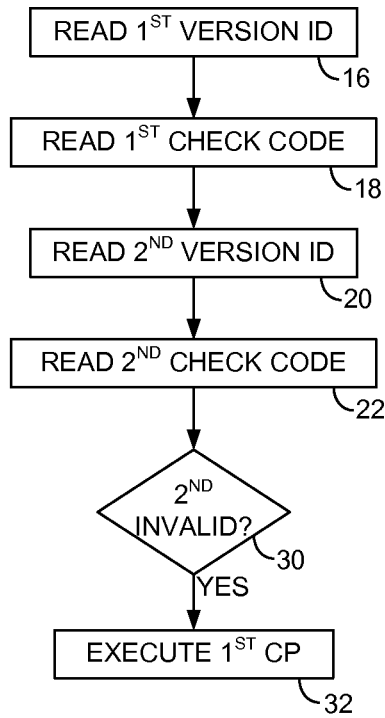
FIG. 2 is a flow diagram according to an embodiment of the present invention wherein when the second VID is invalid, the first version of the CP is selected.

FIG. 1A shows an electronic device 2 according to an embodiment of the present invention comprising a non-volatile memory 4 storing a first version of a control program (CP) 6A, a first header 8A comprising a first version identifier (VID) 10A identifying the first version of the CP 6A and a first VID check code 12A generated in response to at least the first VID 10A. The non-volatile memory 4 further stores a second version of the CP 6B, and a second header 8B comprising a second VID 10B identifying the second version of the CP 6B and a second VID check code 12B generated in response to at least the second VID 10B. The electronic device 2 further comprises control circuitry 14 operable to execute the flow diagram of FIG. 1B, wherein the first VID is read from the first header (step 16), and the first VID check code is read from the first header to verify the validity of the first VID (step 18). The second VID is read from the second header (step 20), and the second VID check code is read from the second header to verify the validity of the second VID (step 22). When the first and second VIDs are valid (step 24), the control circuitry 14 selects between the first version and the second version of the CP in response to the first and second VIDs (step 26), and executes the selected version of the CP (step 28).

Any suitable non-volatile memory 4 may be employed in the embodiments of the present invention, such as a disk of a disk drive or any suitable electrically erasable and programmable semiconductor memory (e.g., a flash). When the CP is updated with a new version, the non-volatile memory 4 may store multiple versions of the CP (the new version and one or more older versions). When the electronic device is re-booted, the control circuitry 14 evaluates the VIDs in the headers to determine which version of the CP is the newest version. Any suitable VID may be employed in the embodiments of the present invention, such as a sequential number where the VID having the highest number represents the newest version of the CP. In an alternative embodiment, the VID may comprise a date where the most recent VID represents the newest version of the CP.

In the embodiments of the present invention, each VID is stored in a header that corresponds to a respective CP as illustrated in FIG. 1A. In this manner, when the electronic device is booted it can quickly evaluate the headers to find the VID corresponding to the newest version of the CP. The headers may be implemented in any suitable manner, and in one embodiment, the headers may be stored in a circular buffer having a predetermined number of records. A record with a non-zero VID may be considered as a potentially valid record corresponding to a potentially valid CP.

The VID check code in each header (e.g., VID check code 12A of FIG. 1A) is used to verify the validity of the VID, and in one embodiment, the validity of the corresponding CP. The VID check code protects against a communication error or interruption in the CP update (e.g., due to a reset or power failure) by verifying the integrity of the download. Any suitable check code may be employed to generate the VID check code, such as with a suitable cyclical redundancy check (CRC) code.

In one embodiment, the VID check code is generated over the VID as well as over the CP. For example, as the CP is downloaded into the electronic device the VID check code may be generated over the CP data. Once the CP data has been downloaded, the new VID may be generated and the VID check code updated in response to the new VID. A header comprising the VID and VID check code may then be stored in the non-volatile memory. In an alternative embodiment, the VID check code may be pre-generated and included with the CP when downloaded into the electronic device. The VID check code may then be updated by the control circuitry 14 after the control circuitry 14 generates the corresponding VID. In yet another embodiment, the VID may be included with the CP when downloaded, and the VID check code may be pre-generated over both the CP and the VID.

In one embodiment, when the electronic device is booted (e.g., powered on), it finds the header record storing the VID corresponding to the newest version of the CP. The control circuitry then reads the CP and generates a validation check code over the CP and the VID. If the validation check code matches the VID check code, the CP and VID are validated so that the CP may be executed. If the validation check code does not match the VID check code, it means the corresponding CP is invalid. When this happens, the control circuitry selects an older version of the CP to execute so that the update to the new version of the CP can be restarted. This embodiment is understood generally from the flow diagram of FIG. 2 which expands on the flow diagram of FIG. 1B, wherein when the second VID is invalid (step 30), the control circuitry executes the first version of the CP (step 32).

Figure 3:
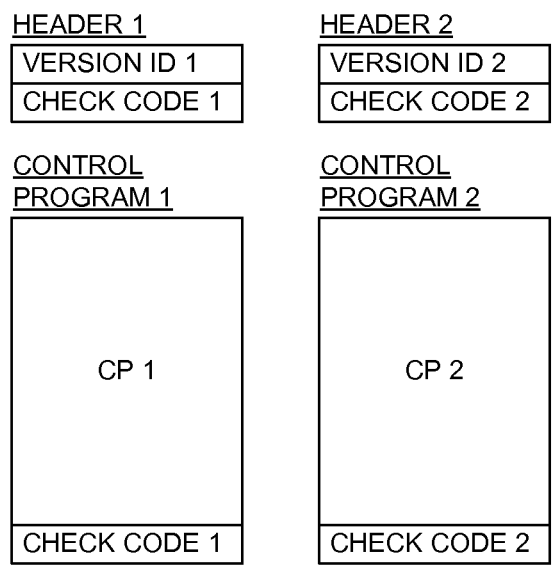
FIG. 3 shows an embodiment of the present invention wherein the VIDs are protected by respective check codes, and the CPs are protected by respective check codes.
Figure 4:
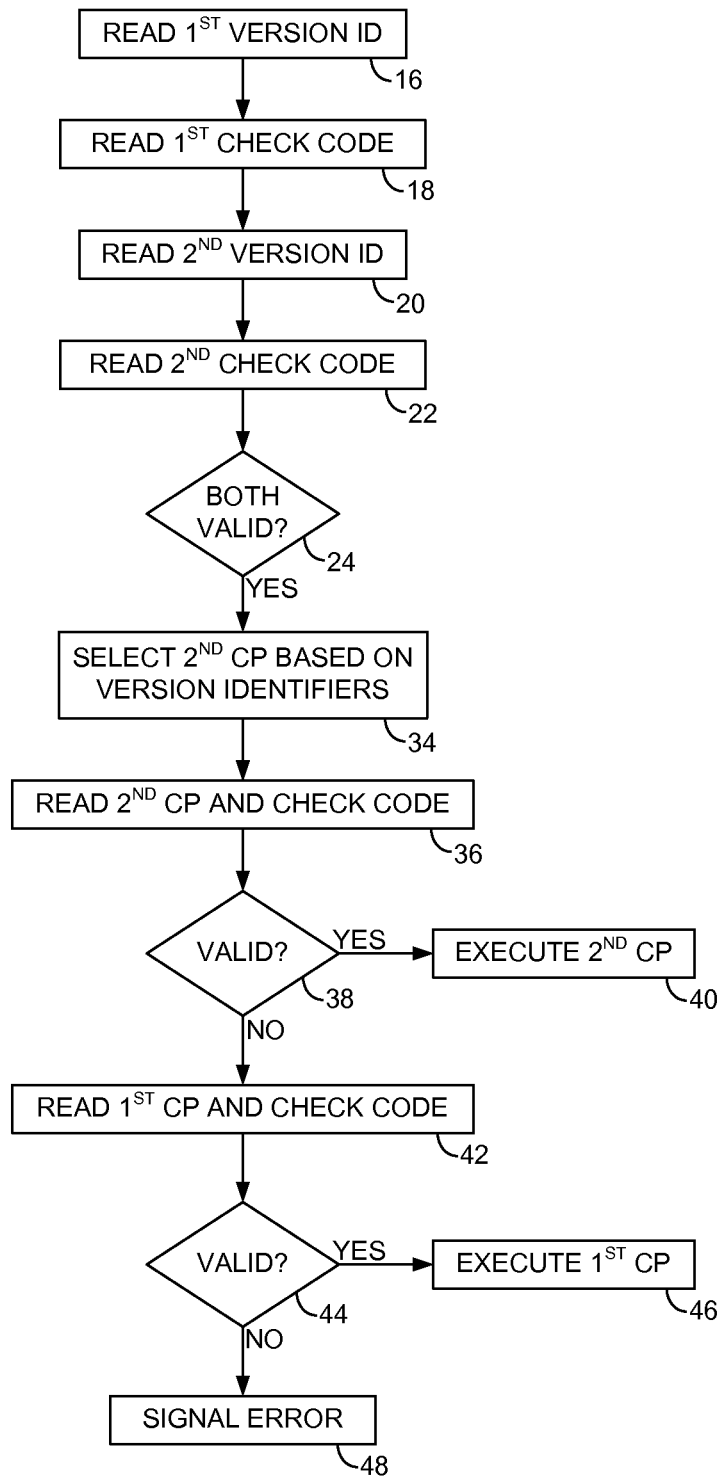
FIG. 4 is a flow diagram according to an embodiment of the present invention wherein the first version of the CP is selected for execution when the second version of the CP fails verification using the check code.

In the embodiment where the VID check code is generated over both the VID and the CP, it requires the control circuitry to read both the VID and the CP from the non-volatile memory in order to generate the validation check code. In an alternative embodiment shown in FIG. 3, the VID check code may be generated over the VID and a separate CP check code may be generated over the CP. In this embodiment, the control circuitry can validate the VID without reading the CP from the non-volatile memory. If the VID is invalid, the control circuitry may select an older version of the CP to execute (after validating the older version using its CP check code). This embodiment is understood with reference to the flow diagram of FIG. 4 which expands on the flow diagram of FIG. 1B, wherein when both first and second VIDs are valid (step 24), the control circuitry selects the second CP since its VID identifies the newest version (step 34). The control circuitry then reads the second CP and generates a validation check code to be compared with its CP check code (step 36). If the validation check code matches the CP check code (step 38), the second CP is executed (step 40). If the validation check code does not match the CP check code (step 38), then the control circuitry reads the first CP and generates a validation check code to be compared with its CP check code (step 42). If the validation check code matches the CP check code (step 44), the first CP is executed (step 46). If the validation check code does not match the CP check code (step 44), then the control circuitry signals an error condition (step 48).

Figure 5A:
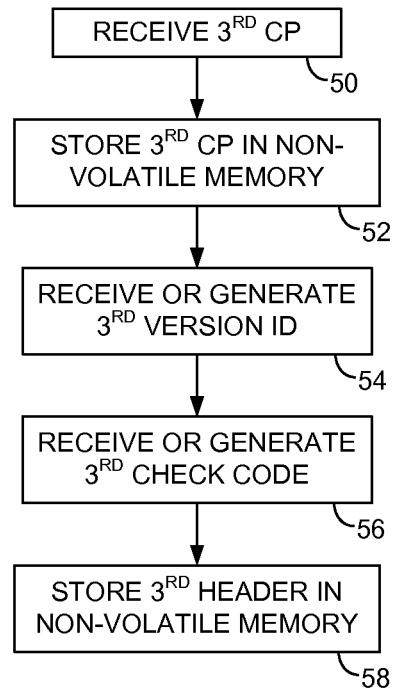
FIG. 5A is a flow diagram according to an embodiment of the present invention wherein when the CP is updated to a third version, the third version of the CP is first stored in the non-volatile memory, and then a corresponding header with VID and check code is stored in the non-volatile memory.

In one embodiment, the VID and VID check code are not stored in the non-volatile memory until after the new version of the CP has been received and stored in the non-volatile memory (and optionally validated). In this manner, if an error occurs (e.g., a power failure) while downloading the new version of the CP, the corresponding header will not have been updated and will therefore be ignored by the control circuitry during the next boot. This embodiment is understood with reference to the flow diagram of FIG. 5A, wherein when updating the CP the new version of the CP (e.g., third version) is first received (step 50) and stored in the non-volatile memory (step 52). A corresponding VID is either received during the download or generated by the control circuitry (step 54), and a VID check code is either received during the download or generated by the control circuitry (step 56). The VID and VID check code are then stored as a header record in the non-volatile memory (step 58) which essentially enables use of the third version of the CP stored in the non-volatile memory.

Figure 5B:
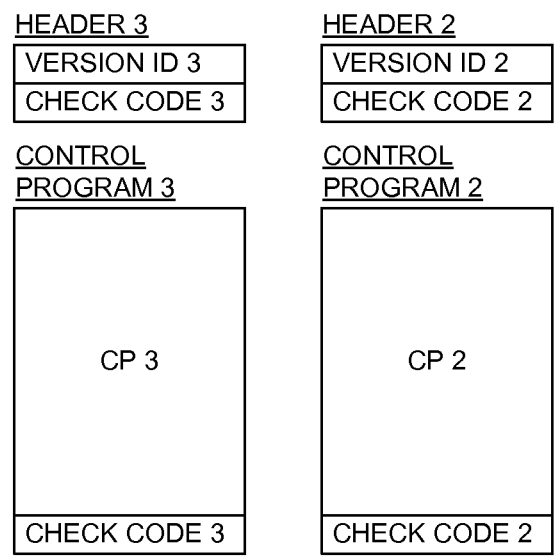
FIG. 5B shows an embodiment of the present invention wherein the third version of the CP and corresponding header overwrite the first version in the non-volatile memory.

FIG. 5B illustrates an embodiment of the present invention wherein when a new version of the CP is received during a download, it overwrites the oldest version of the CP stored in the non-volatile memory. In the example shown in FIG. 5B, a third version of the CP (and corresponding header) overwrite the first version such that the non-volatile memory stores the two most recent versions of the CP. If an error occurs while downloading the third version of the CP, the VID in the corresponding header will not be valid (as detected from the VID check code) and therefore the control circuitry will execute the second version of the CP.

Figure 6A:
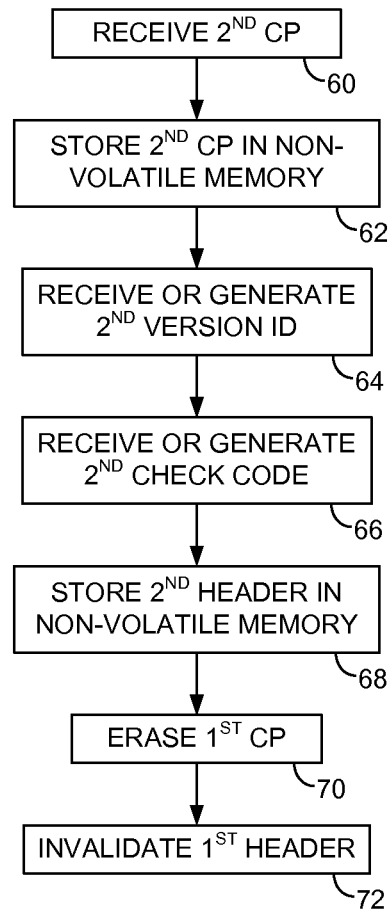
FIGS. 6A and 6B illustrate an embodiment of the present invention wherein the first version of the CP is erased and the header invalidated after storing the second version of the CP in the non-volatile memory.
Figure 6B:
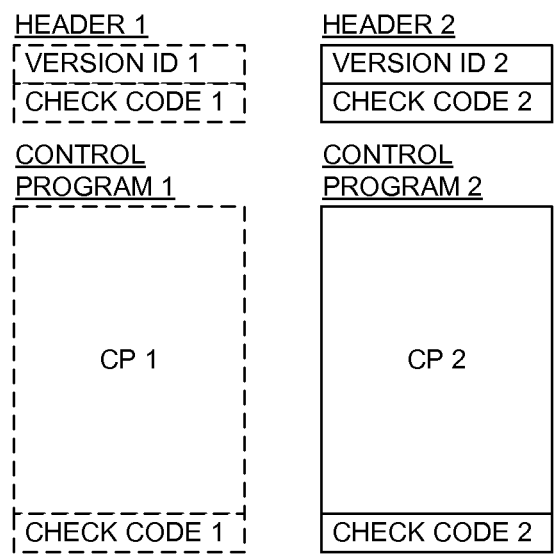

In one embodiment, the control circuitry maintains only one copy of the CP in the non-volatile memory wherein the older version of the CP is erased. This embodiment is understood with reference to the flow diagram of FIG. 6A and example of FIG. 6B wherein during an update of the CP a second version of the CP is received (step 60) and stored in the non-volatile memory (step 62). The corresponding VID is either received or generated (step 64) and the VID check code either received or generated (step 66). The VID and VID check code are stored as a header record in the non-volatile memory (step 68). If the header record for the second version is successfully stored in the non-volatile memory, then the first version of the CP can be safely erased (step 70) and the first header invalidated (step 72) such as by clearing the header. This embodiment may help expedite the next update operation by freeing space in the non-volatile memory for the next download, particularly in an embodiment where the non-volatile memory cannot be overwritten (e.g., flash memory that must first be erased and then re-programmed). In one embodiment, erasing an older version of the CP is deferred until the electronic device enters an idle mode rather than immediately erasing the older version after receiving a new version. This embodiment avoids impacting the perceived performance of the electronic device since erasing an older CP version may take some time.

In one embodiment, the header of an older CP version may be invalidated (e.g., cleared) with or without erasing the corresponding CP. In either case, invalidating the header of an older CP version may improve performance during the next boot cycle of the electronic device by reducing the number of headers the control circuitry needs to evaluate. For example, if there is only one valid header, the control circuitry can immediately begin to read and execute the corresponding CP without needing to check the VID of other headers.

Figure 7A:
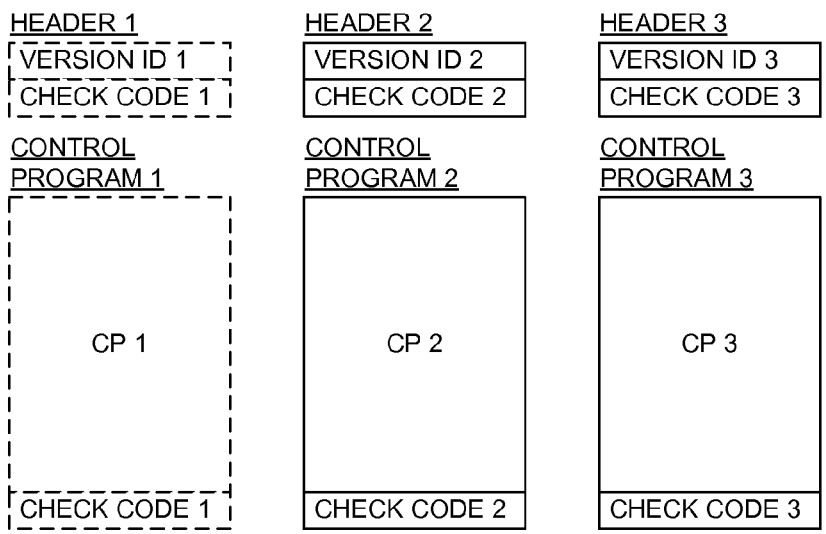
FIGS. 7A-7C illustrate an embodiment of the present invention wherein at least two copies of the CP are stored in the non-volatile memory and the oldest version of the CP is erased.
Figure 7B:
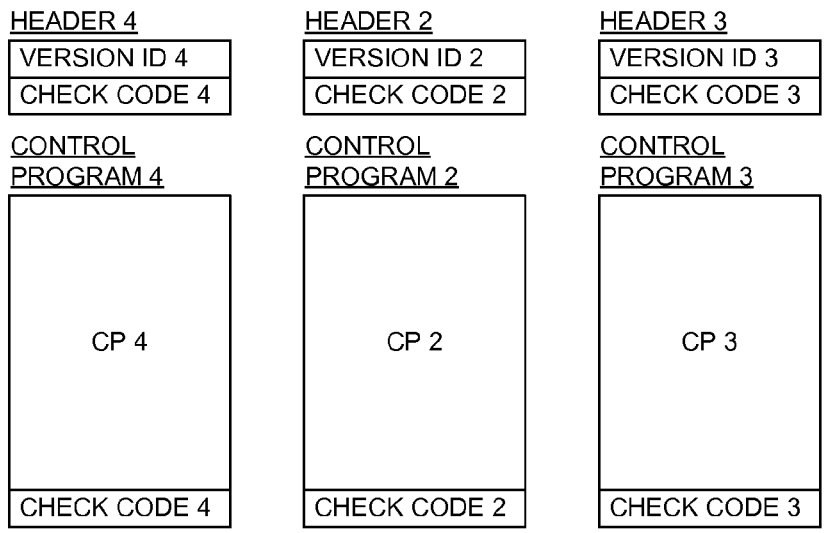
Figure 7C:
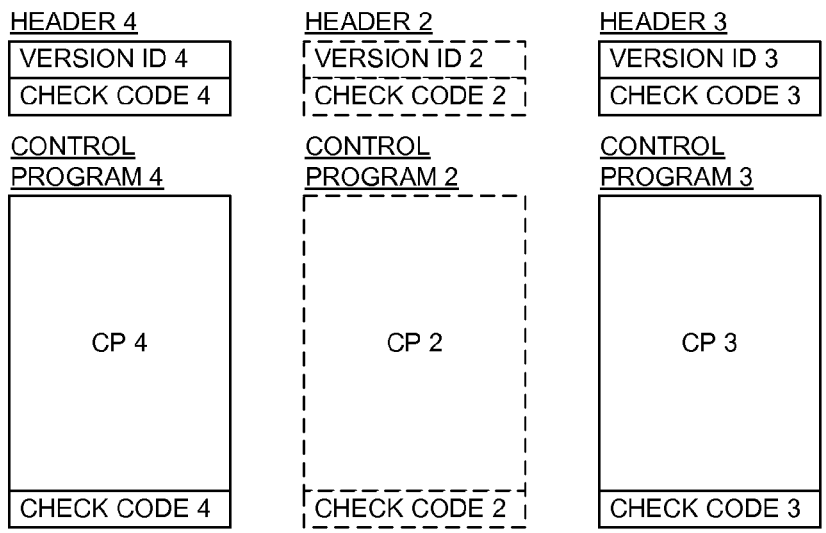

In one embodiment, the control circuitry maintains at least two versions of the CP in the non-volatile memory so there is redundancy in the event that one version becomes corrupted. An example of this embodiment is illustrated in FIGS. 7A-7C where the control circuitry reserves space in the non-volatile memory to store three versions of the CP. In FIG. 7A, the non-volatile memory stores a second and third version of the CP, wherein the first version of the CP has been erased. When a fourth version of the CP is received, it is stored in the free space as illustrated in FIG. 7B. The oldest version of the CP (version 2) is then erased as illustrated in FIG. 7C.

The control circuitry for implementing the embodiments of the present invention within an electronic device may comprise any suitable circuitry, such as any suitable integrated circuit or circuits. In one embodiment, the control circuitry comprises a microprocessor executing instructions, the instructions being operable to cause the microprocessor to implement the embodiments described herein. The instructions may be stored in any suitable computer-readable medium. In one embodiment, the instructions may be stored in a non-volatile semiconductor memory external to the microprocessor, or integrated with the microprocessor in a system on a chip (SOC).

What is claimed is:

1. A method of operating an electronic device, the electronic device comprising a non-volatile memory comprising:
   first and second distinct versions of a control program (CP);
   a first header comprising a first version identifier (VID) identifying the first version of the CP and a first VID check code generated based at least in part on the first VID; and
   a second header comprising a second VID identifying the second version of the CP and a second VID check code generated based at least in part on the second VID; and
   the method comprising:
      generating a first validation VID check code based at least in part on the first VID;
      reading the first VID from the first header;
      determining whether the first validation VID check code matches the first VID check code from the first header to verify the validity of the first VID;
      generating a second validation VID check code based at least in part on the second VID;
      reading the second VID from the second header;
      determining whether the second validation VID check code matches the second VID check code from the second header to verify the validity of the second VID;
      when the first and second VIDs are valid, selecting a version between the first version and the second version of the CP based at least in part on the first and second VIDs;
      generating a validation CP check code based at least in part on the selected version of the CP;
      when the validation CP check code matches the CP check code of the selected version of the CP, executing the selected version of the CP; and
      erasing the non-selected version of the CP from the non-volatile memory and invalidating the header of the non-selected version.

2. The method as recited in claim 1, wherein when the first VID is invalid, further comprising selecting the second version of the CP to execute.

3. The method as recited in claim 1, further comprising:
   receiving a third version of the CP;
   storing the third version of the CP in the non-volatile memory; and
   after storing the third version of the CP in the non-volatile memory, storing a third header in the non-volatile memory, wherein the third header comprises a third VID identifying the third version of the CP.

4. The method as recited in claim 3, further comprising receiving the third VID.

5. The method as recited in claim 3, further comprising generating the third VID.

6. The method as recited in claim 3, wherein:
   a third VID check code is included in the third header stored in the non-volatile memory; and
   the third VID check code for verifying the third VID.

7. The method as recited in claim 6, further comprising generating the third VID check code over at least the third VID.

8. An electronic device comprising:
   control circuitry; and
   a non-volatile memory comprising:
      first and second distinct versions of a control program (CP) stored in the non-volatile memory by the control circuitry, each including a CP check code;
      a first header stored in the non-volatile memory by the control circuitry and comprising a first version identifier (VID) identifying the first version of the CP and a first VID check code generated based at least in part on the first VID; and
      a second header stored in the non-volatile memory by the control circuitry and comprising a second VID identifying the second version of the CP and a second VID check code generated based at least in part on the second VID;
   wherein the control circuitry is operable to:
      generate a first validation VID check code based at least in part on the first VID;
      read the first VID from the first header;
      determine whether the first validation VID check code matches the first VID check code from the first header to verify the validity of the first VID;
      generate a second validation VID check code based at least in part on the second VID;
      read the second VID from the second header;
      determine whether the second validation VID check code matches the second VID check code from the second header to verify the validity of the second VID;
      when the first and second VIDs are valid, select a version between the first version and the second version of the CP based at least in part on the first and second VIDs;
      generate a validation CP check code based at least in part on the selected version of the CP;
      when the validation CP check code matches the CP check code of the selected version of the CP, execute the selected version of the CP; and
      erase the non-selected version of the CP from the non-volatile memory and invalidate the header of the non-selected version.

9. The electronic device as recited in claim 8, wherein when the first VID is invalid, the control circuitry is operable to select the second version of the CP to execute.

10. The electronic device as recited in claim 8, wherein the control circuitry is further operable to:
    receive a third version of the CP;
    store the third version of the CP in the non-volatile memory; and
    after storing the third version of the CP in the non-volatile memory, store a third header in the non-volatile memory, wherein the third header comprises a third VID identifying the third version of the CP.

11. The electronic device as recited in claim 10, wherein the control circuitry is further operable to receive the third VID.

12. The electronic device as recited in claim 10, wherein the control circuitry is further operable to generate the third VID.

13. The electronic device as recited in claim 10, wherein:
    a third VID check code is included in the third header stored in the non-volatile memory; and
    the third VID check code for verifying the third VID.

14. The electronic device as recited in claim 13, wherein the control circuitry is further operable to generate the third VID check code over at least the third VID.

* * * * *